United States Patent

Takamatsu et al.

[11] Patent Number: 6,155,718
[45] Date of Patent: Dec. 5, 2000

[54] SLIDE GUIDE AND ITS ROLLER CHAIN WITH ENDS

[75] Inventors: Hiroshi Takamatsu; Hiroaki Mochizuki; Tomozumi Murata, all of Tokyo, Japan

[73] Assignee: THK Co., Ltd., Tokyo, Japan

[21] Appl. No.: 09/051,256

[22] PCT Filed: Jun. 23, 1997

[86] PCT No.: PCT/JP97/02154

§ 371 Date: Apr. 14, 2000

§ 102(e) Date: Apr. 14, 2000

[87] PCT Pub. No.: WO97/49931

PCT Pub. Date: Dec. 31, 1997

[30] Foreign Application Priority Data

Jun. 27, 1996 [JP] Japan .................................. 8-167985

[51] Int. Cl.[7] .................................................. F16C 33/56
[52] U.S. Cl. ................................................. 384/45; 384/51
[58] Field of Search ................................ 384/45, 49, 51

[56] References Cited

U.S. PATENT DOCUMENTS 5,947,605  9/1999  Shirai ........................................ 384/45
5,988,883  11/1999  Takamatu et al. ........................ 384/45

FOREIGN PATENT DOCUMENTS

| 5-52217 | 3/1993 | Japan . |
|---|---|---|
| 5-126149 | 5/1993 | Japan . |
| 5-196036 | 8/1993 | Japan . |
| 5-196037 | 8/1993 | Japan . |
| 6-56181 | 7/1994 | Japan . |
| 7-317762 | 12/1995 | Japan . |

*Primary Examiner*—Thomas R. Hannon
*Attorney, Agent, or Firm*—Arent Fox Kitner Plotkin & Kahn, PLLC

[57] ABSTRACT

This invention relates to a sliding guide apparatus for, for example, a linear guiding apparatus, curved guiding apparatus, swiveling bearing or the like for infinite sliding motion, and more particularly to a sliding guide apparatus wherein an end-present rolling element chain for supporting a linear motion or rotary motion is inserted in a full track. The sliding guide apparatus comprises a track rail having a rolling path for rolling elements extending in the length direction of the sliding guide apparatus, a moving body which contains a loaded rolling path facing the aforementioned rolling path and an unloaded rolling path which circulates the rolling elements from one end to the other end of the loaded rolling path and moves along the aforementioned track rail, and a plurality of rolling elements which roll between the moving body and track rail while being loaded with a load and circulate in a full track composed of the loaded rolling path and unloaded rolling path of the aforementioned moving body. The rolling elements are disposed in line at predetermined intervals in a single or plurality of flexible connecting belts such that they can roll freely and incorporated in the full track of the sliding member together with the connecting belts. The connecting belts circulate with the balls in the full track of the sliding member while both end portions thereof are opposed to each other.

4 Claims, 4 Drawing Sheets

SLIDE GUIDE AND ITS ROLLER CHAIN WITH ENDS

FIELD OF THE INVENTION

This invention relates to a sliding guide apparatus for, for example, a linear guiding apparatus, curved guiding apparatus, swiveling bearing or the like for infinite sliding motion, and more particularly to a sliding guide apparatus wherein an end-present rolling element chain for supporting a linear motion or rotary motion is inserted in a full track.

BACKGROUND ART

In various sliding guide apparatuses containing bearing, by using rolling motion of rolling elements such as balls or rollers interposed between a track rail and a moving body, relative linear motion or rotary motion between the track rail and moving body is enabled. To (1) prevent the rolling elements from falling out of the moving body when the moving body is separated from the track rail, (2) reduce frictional resistance by avoiding relative contact between respective rolling elements, and (3) arrange the rolling elements at predetermined positions so as to secure a smooth motion or the like, generally a plurality of the rolling elements are incorporated between the track rail and moving body while being held by rolling element retainer or rolling element cage made of metallic thin plate or synthetic resin.

However, in a sliding guide apparatus using a conventional rolling element retainer, this rolling element retainer is incorporated in the moving body and then the rolling elements are incorporated in a rolling path formed for the rolling elements. Then, the moving body is installed on the track rail. Particularly if this sliding guide apparatus contains a full track of the rolling elements, assembly work for this sliding guide apparatus using the rolling element retainer requires experienced skill, so that automation thereof is difficult.

In the sliding guide apparatus using the conventional rolling element cage, the rolling element cage has a plurality of pockets such that respective rolling elements are rotatably held in these pockets. Thus, assembly work for incorporating the plurality of the rolling elements into the sliding guide apparatus is easy. However, because it is necessary to incorporate the plurality of the rolling elements in the respective pockets of the rolling element cage and hold them so that they do not slip out, it takes time and labor to produce this rolling element cage itself.

Therefore, to solve such problem, various ball chains which are produced by injection molding of resin with balls being disposed as inner ring on a substantially flat plane in a mold so that they are incorporated without an end in a full track of a moving body have been proposed (Japanese Examined Patent Publication No. Hei 6-56181, Japanese Unexamined Patent Application No. Hei 5-52217, Japanese Unexamined Patent Application No. Hei 5-126149, Japanese Unexamined Patent Application No. Hei 5-196036, Japanese Unexamined Patent Application No. Hei 5-196037).

In this conventional ball chain, after the ball chain is incorporated in a full track of a moving body, both end portions thereof are connected to each other so as to form an endless ball chain. However, this connecting work is very troublesome.

In such a sliding guide apparatus, following so-called ball selective engagement method has been applied to support four directional loads including radial, reverse radial and right/left direction loads between the moving body and track rail, and further improve accuracy of reciprocation of the moving body relative to the track rail and stiffness thereof. That is, pre-pressure is applied to each ball of the ball chain interposed between the moving body and track rail or this pre-pressure may be sometimes adjusted. To apply the pre-pressure and adjust it, as a general easy method, a ball having a slightly larger size than a dimension of a gap between the loaded rolling path of the moving body and a rolling path of the track rail is selected and engaged. At this time, its sliding resistance and stiffness are measured so as to determine the size of a ball for use.

However, in the sliding guide apparatus using the aforementioned conventional ball chain, when this ball selective engagement is carried out, if the ball chain first incorporated in the moving body and connected endlessly has not achieved a desired sliding resistance and stiffness due to its ball diameter, this endless connection of the ball chain must be released so as to create ends thereof and that ball chain having the ends must be removed from the moving body. Then, another ball chain having ends and a different ball diameter is incorporated in the moving body and connected endlessly. Whether or not this incorporated ball chain has achieved its desired sliding resistance and stiffness is investigated. Until the ball diameter of the ball chain incorporated in the moving body achieved its desired sliding resistance and stiffness, the same procedure must be repeated. As a result, the ball selective engagement method which is essentially a simple method for application of pre-pressure and adjustment thereof, conversely becomes a very complicated method.

DISCLOSURE OF THE INVENTION

The present invention has been proposed in viewpoints of this problem. It therefore is an object thereof to provide a sliding guide apparatus and an end-present rolling element chain thereof, which are easy to handle without slip-out of the rolling elements and incorporate in a full track of the sliding guide apparatus while automation of such procedures is also easy, and wherein not only the ball selective engagement method for application of pre-pressure and adjustment thereof can be applied without making its operation complicated, but also the operation of the ball selective engagement method is further made easy to facilitate handling of the rolling elements so that they do not slip out.

According to the present invention, there is provided a sliding guide apparatus containing a track rail, a moving body which moves along the track rail and a plurality of rolling elements which roll between the moving body and track rail while being loaded with a load, the track rail having a rolling path on which the rolling elements roll, the moving body comprising a main unit having a loaded rolling path in which loaded rolling elements roll facing the rolling path of the track rail and an unloaded rolling path in which unloaded rolling elements roll, and a pair of lid portions which are mounted on front and rear ends in advancement direction and in which direction changing paths for the rolling elements for connecting the loaded rolling path and the unloaded rolling path are formed, the loaded rolling path and unloaded rolling path of the moving body, direction changing path and rolling path of the track rail facing the loaded rolling path of the moving body forming full tracks for the rolling elements, the plurality of rolling elements being connected by flexible resin connecting body having interposed portions which are interposed between the respective rolling elements and connecting portions for connecting the respective interposed portions so as to hold the plurality of the rolling elements in arranged condition such that they can roll, and further having both end portions, the plurality of rolling elements being further composed in the form of a single or plural end-present rolling element chains which are built into the full track.

Further according to the present invention, there is provided an end-present rolling element chain comprising a plurality of rolling elements and a resin connecting body having interposed portions which are interposed between the rolling elements and connecting portions for connecting the respective interposed portions so as to hold the plurality of rolling elements in arranged condition such that the rolling elements can roll, the resin connecting body having chamfered guiding portions for guiding both end portions of the resin connecting body.

According to the present invention, the track rail of the sliding guide apparatus has rolling paths for the rolling elements in its axial direction. The shape of this rolling path is not restricted to any particular one, but for example if the rolling element is a ball, this may be circular arc groove or gothic arc groove. Further, the number of the rolling grooves can be arbitrarily determined depending on the number of the full tracks formed on the moving body. For example, it is permissible to form one track on single side or two tracks on single side.

The moving body forming the sliding guide apparatus comprises a main unit having a loaded rolling path in which loaded rolling elements roll facing the rolling path of the track rail and an unloaded rolling path in which unloaded rolling elements roll, and a pair of lid portions which are mounted on front and rear ends in advancement direction and in which direction changing paths for the rolling elements for connecting the loaded rolling path and the unloaded rolling path are formed. The shape and structure thereof, the number of the incorporated full tracks, performance, function and the like are not restricted to any particular ones. For example, a type in which a single full track is provided on single side, a type in which two tracks are provided on single side, a type in which loads in four directions are supported, a type in which one side supports downward load while the other side supports upward load, a type in which a bearing lace having a loaded rolling path is provided, and the like are available.

Preferably, the main unit of this moving body is composed of a bearing race having at least a loaded rolling path and a resin forming portion which is formed on this bearing race in mold. Further preferably, it is permissible to form guiding grooves for guiding a resin connecting body of the end-present rolling element chain in an unloaded area (that is, an unloaded rolling path formed in the resin forming portion of the main unit and direction changing path formed by a pair of lid portions made of synthetic resin) of the full track formed in this moving body. Further, it is permissible to form a ball holding portion made of synthetic resin on both sides of the loaded rolling path of the bearing race as a part of the resin forming portion and a guiding groove for guiding the resin connecting portion of the end-present rolling element chain over an entire range of the full track including this ball holding portion.

Further according to the present invention, the end-present rolling element chain comprises a plurality of rolling elements and a resin connecting body having interposed portions which are interposed between the respective rolling elements and connecting portions for connecting the respective interposed portions so as to hold the plurality of the rolling elements in arranged condition such that they can roll. Preferably, chamfered guiding portions for guiding both end portions of the resin connecting body are formed at the both end portions of the resin connecting body. Consequently, when the end-present rolling element chain is moved in the full track, particularly when the both end portions of the end-present rolling element chain invade into the direction changing guiding hole or escapes from this direction changing guiding hole, the both end portions are guided so as to move the chain smoothly. As for the chamfered guiding portions formed on both ends of the resin connecting body, a radius of curvature, shape and the like thereof are determined and designed taking into account a radius of curvature and the like of the direction changing path in the full track of the sliding guide apparatus.

Although the length of the end-present rolling element chain is determined taking into account a length of the full track of the sliding guide apparatus in which the chain is used, if the sliding guide apparatus is so large that the length of the full track is very long, it is permissible to divide this full track to plural sections, that is, 2 or 3 sections, thereby making it possible to reduce the size of forming molds. In this case, it is recommended to form the chamfered guiding portions on both end portions of each resin connecting body of a divided end-present rolling element chain.

Here, as a rolling element for use in such an end-present rolling element chain, concretely balls or rollers are available. As a rolling element for use in a sliding guide apparatus requiring a smooth sliding property, the ball is preferred. As a rolling element for use in a sliding guide apparatus in which a relatively heavy load is applied, the roller is preferred.

Further, as a method for producing the end-present rolling element chain of the present invention, a method for forming a resin connecting body holding a plurality of the rolling elements by injection molding with the plurality of the rolling elements disposed as inner rings, is available. For the injection molding with the plurality of the rolling elements disposed as inner rings, so-called insert moldings disclosed in the aforementioned Japanese Examined Patent Publication No. Hei 6-56181, Japanese Unexamined Patent Application No. Hei 5-52217, Japanese Unexamined Patent Application No. Hei 5-126149, Japanese Unexamined Patent Application No. Hei 5-196036, Japanese Unexamined Patent Application No. Hei 5-196037, are applicable.

BEST MODE FOR CARRYING OUT THE INVENTION

Hereinafter, the embodiment of a linear sliding guide apparatus shown in the accompanying drawing will be described in detail.

Figure 1:
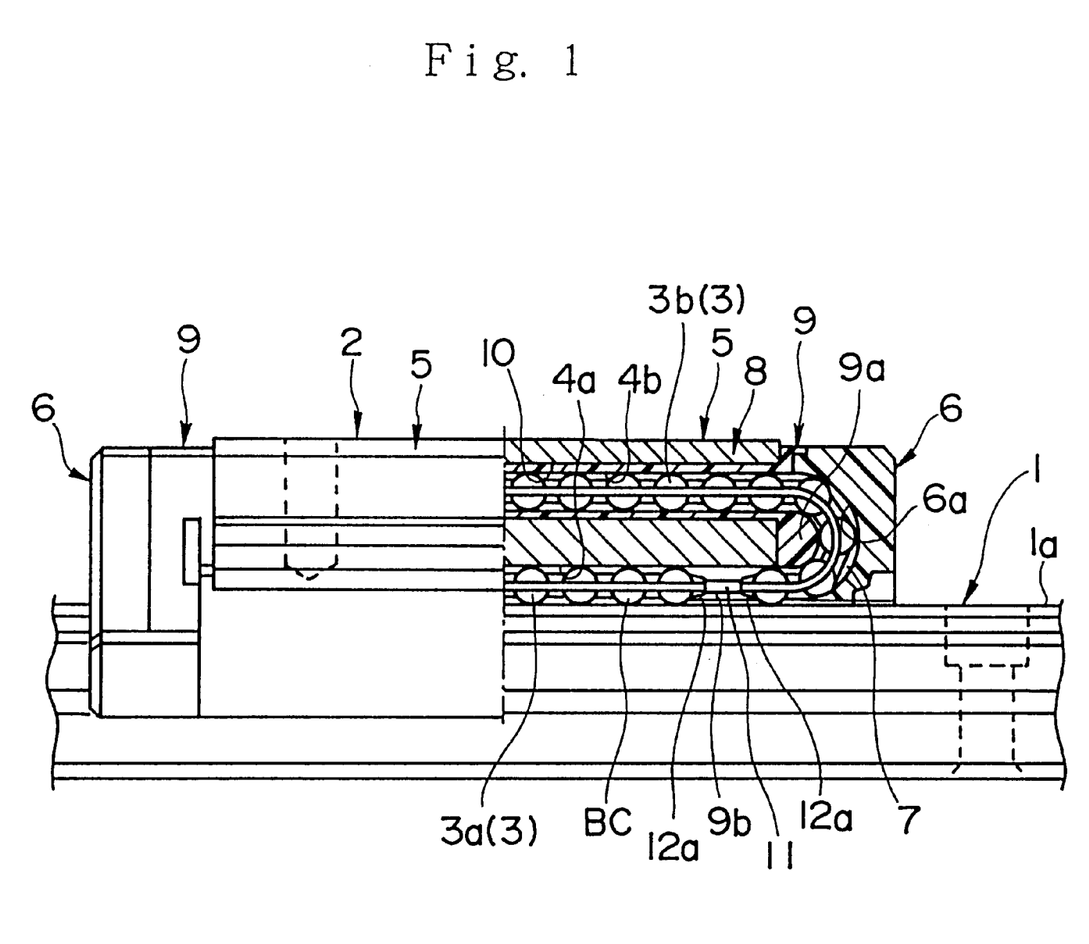
FIG. 1 is a partially sectional side view of a linear sliding guide apparatus according to an embodiment of the present invention.
Figure 2:
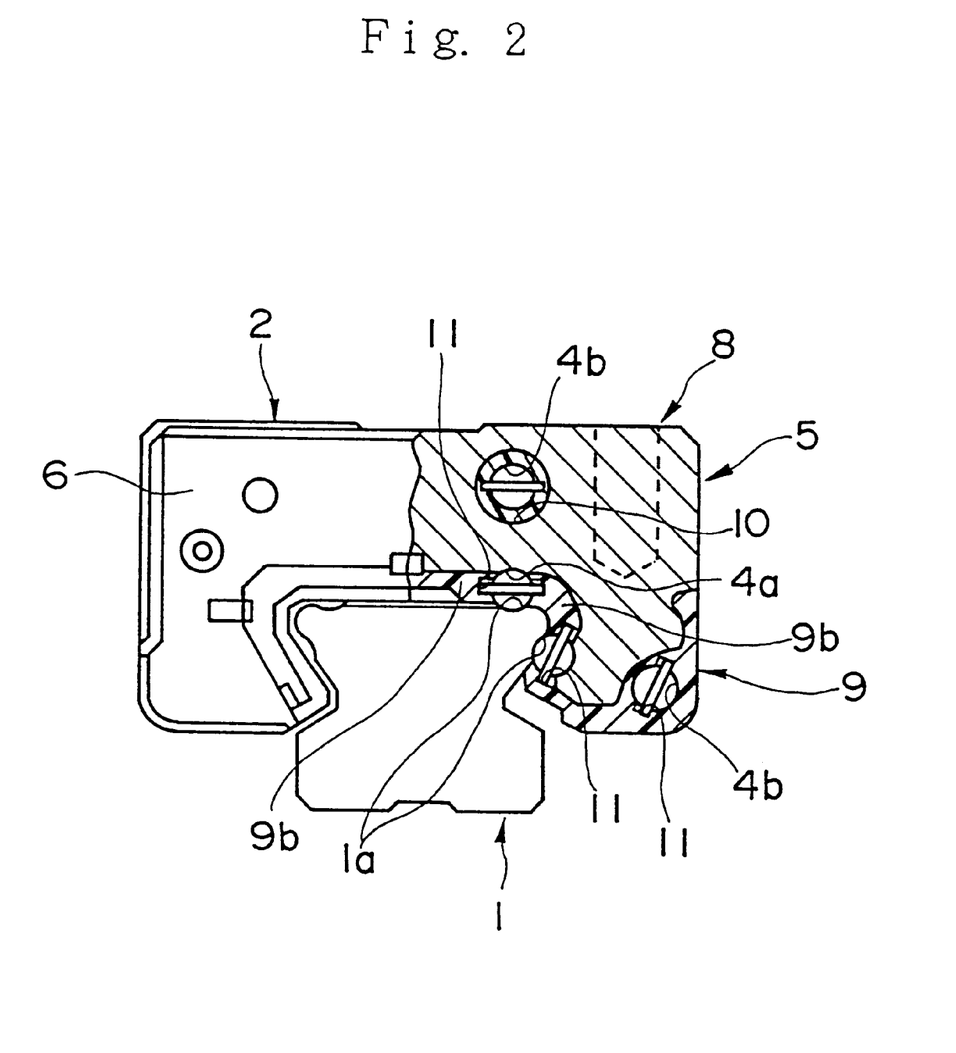
FIG. 2 is a partially sectional front view of FIG. 1.
Figure 3:
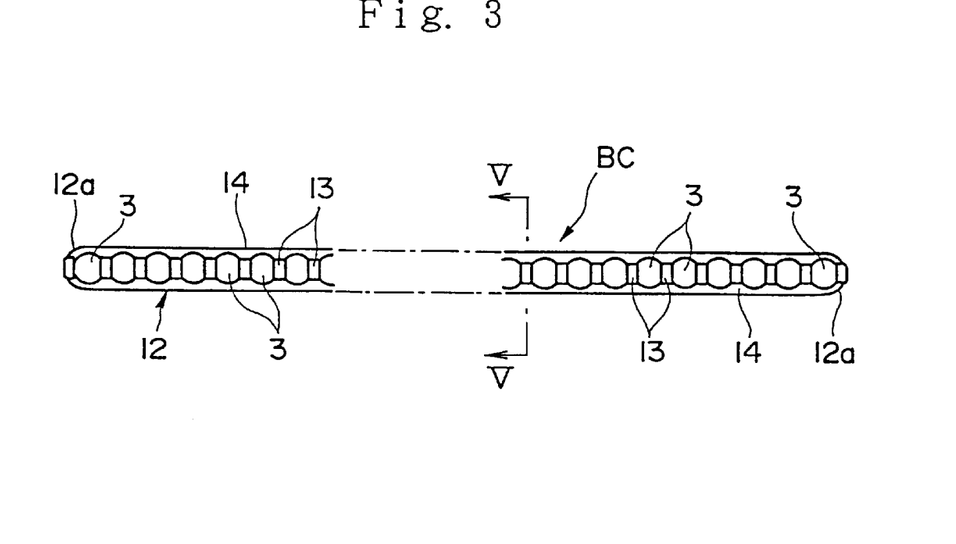
FIG. 3 is a plan view of an end-present rolling element chain for use in the linear sliding guide apparatus of FIG. 1.
Figure 4:
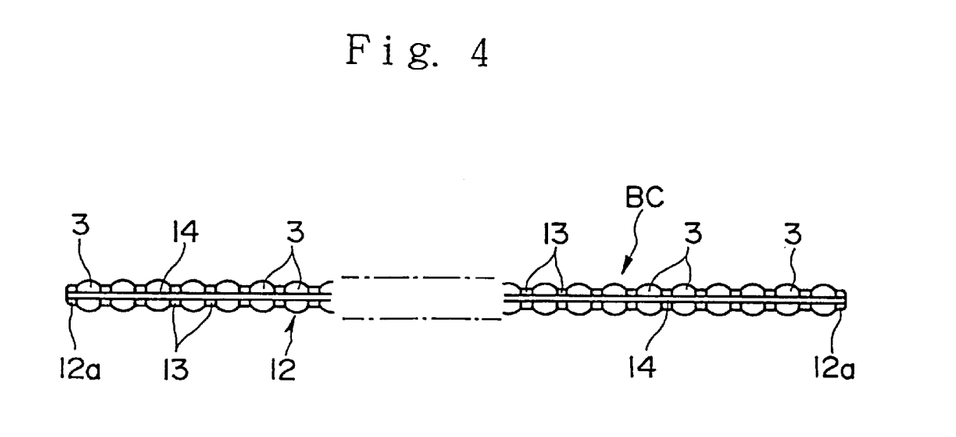
FIG. 4 is a front view of FIG. 3.

FIGS. 1 and 2 show a linear sliding guide apparatus according to an embodiment of the present invention. This linear sliding guide apparatus basically is formed of end-present rolling element chain BC comprising a track rail 1, a sliding base (moving body) 2 moving along this track rail 1 and a plurality of balls (rolling elements) 3 rolling between the sliding base 2 and track rail 1 while being loaded with a load.

According to this embodiment, the aforementioned track rail 1 has four rolling grooves (rolling paths) 1a, two grooves being provided on each side of right and left shoulders, such that the balls 3 roll in the rolling grooves 1a.

The aforementioned sliding base 2 comprises a main unit 5 having a loaded ball rolling groove (loaded rolling path) 4a in which load applied balls (loaded balls) 3a roll facing the rolling groove la of the track rail 1 and an unloaded ball guiding hole (unloaded rolling path) 4b in which no-load applied balls (unloaded balls) 3b roll, and a pair of lid portions 6 which are mounted on front and rear ends in advancement direction and in which direction changing holes (direction changing paths) 7 for the balls 3 for connecting the loaded ball rolling groove 4a and the unloaded ball guiding hole 4b are formed. Full track for the ball 3 is formed by the loaded ball rolling groove 4a and unloaded ball guiding hole 4b in the aforementioned sliding base 2, direction changing hole 7 formed in the respective lid portions 6 and the rolling groove la of the track rail 1 facing the loaded ball rolling groove 4a in the sliding base 2.

Figure 5:
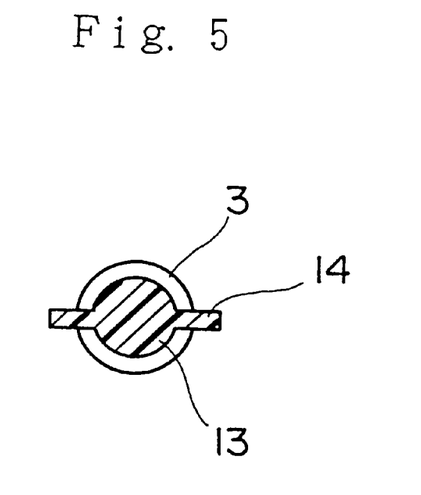
FIG. 5 is a sectional view taken along the lines V—V of FIG. 1.
Figure 6:
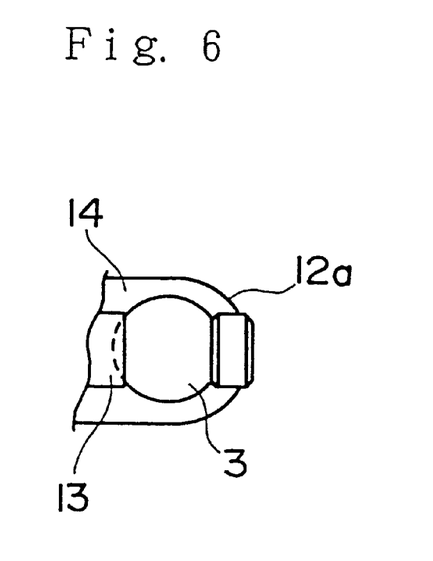
FIG. 6 is a partially enlarged plan view showing an enlargement of an end portion of the end-present rolling element chain shown in FIG. 3.

According to this embodiment, the main unit 5 of the aforementioned sliding base 2 comprises a metallic bearing race 8 having the loaded ball rolling groove 4a and through hole 10, and a resin forming portion 9 which is insert-formed on the bearing race 8 in a mold and has a direction changing guide portion 9a, which forms the direction changing guide hole 7 together with the unloaded ball guiding hole 4b and the direction changing guiding groove 6a formed inside the respective lid portions 6, and a ball holding portion 9b formed along the loaded ball rolling groove 4a of the bearing race 8. A guiding groove 11 is formed in the unloaded ball guiding hole 4b and ball holding portion 9b of the resin forming portion 9 and direction changing guiding groove 6a of the respective lid portions 6 such that it extends endlessly along the formed full track, and guides the end-present rolling element chain BC incorporated in the full track so as to smooth a circulation of this end-present rolling element chain BC.

As shown in FIGS. 3 through 6, the end-present rolling element chain BC is formed of flexible resin connecting body 12 which has a plurality of balls 3, interposed portions 13 which are interposed between the balls 3 and connecting portions 14 for connecting the respective interposed portions 13 so as to hold the plurality of the balls 3 in arranged condition such that they can roll and has both end portions, and chamfered guiding portions 12a for guiding both end portions of this resin connecting body 12 are formed on the both portions of this resin connecting body 12. Consequently, when the end-present rolling element chain BC is moved in the full track, particularly when the both end portions of the end-present rolling element chain BC invade into the direction changing guiding hole 7 or escapes from this direction changing guiding hole 7, the both end portions are guided so as to move the chain BC smoothly.

When this end-present rolling element chain BC is incorporated in the full track of the sliding guide apparatus, the connection portions 14 composing the resin connecting body 12 of this end-present rolling element chain BC are engaged with the guiding grooves 11 formed in the afore-mentioned sliding base 2 so that the posture of the end-present rolling element chain BC is controlled during circulation thereof in the full track so as to secure a smooth rolling of the balls 3. The chamfered guiding portions 12a formed on the both end portions of the resin connecting body 12 guide the front end portion of the end-present rolling element chain BC so as to achieve smooth circulation of the end-present rolling element chain BC.

INDUSTRIAL APPLICABILITY

As described above, according to the sliding guide apparatus and end-present rolling element chain of the present invention, the rolling elements are free of slip-out, easy to use and easy to be incorporated in the full track of the sliding guide apparatus. Further, automation of that work is possible. A ball selective engagement method for application of the pre-pressure and adjustment thereof can be applied without damaging its easy property thereof, and rather its operability thereof can be further improved.

What is claimed is:

1. A sliding guide apparatus containing a track rail, a moving body which moves along said track rail and a plurality of rolling elements which roll between said moving body and track rail while being loaded with a load, said track rail having a rolling path on which said rolling elements roll, said moving body comprising a main unit having a loaded rolling path in which loaded rolling elements roll facing the rolling path of said track rail and an unloaded rolling path in which unloaded rolling elements roll, and a pair of lid portions which are mounted on front and rear ends in advancement direction and in which direction changing paths for said rolling elements for connecting the loaded rolling path and the unloaded rolling path are formed, said loaded rolling path and unloaded rolling path of said moving body, direction changing path and rolling path of said track rail facing said loaded rolling path of said moving body forming full tracks for said rolling elements, said plurality of rolling elements being connected by flexible resin connecting body having interposed portions which are interposed between the respective rolling elements and connecting portions for connecting the respective interposed portions so as to hold said plurality of the rolling elements in arranged condition such that they can roll, and further having both end portions, said plurality of rolling elements being further composed in the form of a single or plural end-present rolling element chains which are built into said full track.

2. A sliding guide apparatus according to claim 1 wherein the main unit of said moving body comprises a bearing race having at least the loaded rolling path and a resin forming portion formed on said bearing race in mold.

3. A sliding guide apparatus according to claim 1 or 2 wherein said end-present rolling chain contains chamfered guiding portions which are provided on both ends of the resin connecting body and guide a circulation of said end-present rolling chain in said full-track.

4. An end-present rolling element chain comprising a plurality of rolling elements and a resin connecting body having interposed portions which are interposed between the rolling elements and connecting portions for connecting the respective interposed portions so as to hold said plurality of rolling elements in arranged condition such that said rolling elements can roll, said resin connecting body having chamfered guiding portions for guiding both end portions of said resin connecting body.

* * * * *

UNITED STATES PATENT AND TRADEMARK OFFICE
CERTIFICATE OF CORRECTION

PATENT NO.    : 6,155,718
DATED         : December 5, 2000
INVENTOR(S)   : Hiroshi Takamatsu et al.

It is certified that error appears in the above-identified patent and that said Letters Patent is hereby corrected as shown below:

Item [54],
Change "SLIDE GUID AND ITS ROLLER CHAIN WITH ENDS" to -- SLIDING GUIDE APPARAUTS AND END-PRESENT ROLLING ELEMENTS CHAIN THEREOF --.

Signed and Sealed this

Second Day of October, 2001

Attest:

NICHOLAS P. GODICI
Attesting Officer     Acting Director of the United States Patent and Trademark Office

UNITED STATES PATENT AND TRADEMARK OFFICE
CERTIFICATE OF CORRECTION

PATENT NO. : 6,155,718
DATED : December 5, 2000
INVENTOR(S) : Hiroshi Takamatsu et al.

It is certified that error appears in the above-identified patent and that said Letters Patent is hereby corrected as shown below:

Title page,
Item [54], change "SLIDE GUID AND ITS ROLLER CHAIN WITH ENDS" to
-- SLIDING GUIDE [APPARATUS] AND END-PRESENT ROLLING ELEMENTS CHAIN THEREOF --.

This certificate supersedes certificate of correction issued October 2, 2001

Signed and Sealed this

Twenty-ninth Day of January, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO. : 6,155,718
DATED : December 5, 2000
INVENTOR(S) : Hiroshi Takamatsu et al.

It is certified that error appears in the above-identified patent and that said Letters Patent is hereby corrected as shown below:

<u>Title page,</u>
Item [54], change "SLIDE GUID AND ITS ROLLER CHAIN WITH ENDS" to
-- SLIDING GUIDE APPARATUS AND END-PRESENT ROLLING ELEMENTS CHAIN THEREOF --.

This certificate supersedes certificate of correction issued January 29, 2002

Signed and Sealed this

Twenty-third Day of July, 2002

*Attest:*

JAMES E. ROGAN
*Attesting Officer*     *Director of the United States Patent and Trademark Office*